Nov. 17, 1964 R. J. McCRORY ETAL 3,157,024
REGENERATIVE THERMAL DEVICE
Filed May 21, 1962 9 Sheets-Sheet 1

INVENTOR.
ROLLIN J. McCRORY
WILLIAM H. WILKINSON
BY

Nov. 17, 1964    R. J. McCRORY ETAL    3,157,024
REGENERATIVE THERMAL DEVICE
Filed May 21, 1962    9 Sheets-Sheet 2

INVENTOR.
ROLLIN J. McCRORY
WILLIAM H. WILKINSON
BY

FIG. 11

INVENTOR.
ROLLIN J. McCRORY
WILLIAM H. WILKINSON

INVENTOR.
ROLLIN J. McCRORY
WILLIAM H. WILKINSON
BY

Nov. 17, 1964   R. J. McCRORY ETAL   3,157,024
REGENERATIVE THERMAL DEVICE
Filed May 21, 1962   9 Sheets-Sheet 6

INVENTOR.
ROLLIN J. McCRORY
WILLIAM H. WILKINSON
BY

Nov. 17, 1964  R. J. McCRORY ETAL  3,157,024
REGENERATIVE THERMAL DEVICE

Filed May 21, 1962  9 Sheets-Sheet 7

FIG. 18

INVENTOR.
ROLLIN J. McCRORY
WILLIAM H. WILKINSON
BY

3,157,024
REGENERATIVE THERMAL DEVICE
Rollin J. McCrory, Worthington, and William H. Wilkinson, Columbus, Ohio, assignors, by mesne assignments, to The Battelle Development Corporation, Columbus, Ohio, a corporation of Delaware
Filed May 21, 1962, Ser. No. 196,327
15 Claims. (Cl. 60—24)

This invention relates to a rotary positive-displacement device suitable for use as a prime mover, refrigerator, or heat pump. The basic construction of this invention is combined with various forms of hot-gas apparatus operating on a regenerative cycle.

Regenerative thermal devices, based on the Stirling engine invented many years ago, promise efficient power generation and performance of many other useful functions. Thermal machines based on this principle are extremely versatile. They can convert heat energy to mechanical power or can elevate heat energy to a higher temperature level by a basic process which is much more efficient than that used in conventional devices.

An ideal regenerative thermal unit includes two cylinders each having a moving body within, such as a piston, with the two cylinders connected by a tube and a gas confined between the two pistons. The connecting tube between the two cylinders contains a regenerator or a heat-storing material such as closely packed fine wire mesh. The thermodynamic cycle includes four movements of the pistons. The cylinders may be referred to as hot and cold cylinders. The gas is first expanded in the hot cylinder where heat is simultaneously added to the gas. Without any further change in volume, the gas is then moved through the regenerator to the cold cylinder. The gas is reduced in temperature as it passes through the regenerator since heat is given up to the regenerator material. The gas is then compressed and cooled in the cold cylinder rejecting heat. Finally, the gas is moved at constant volume back to the hot cylinder through the regenerator. Heat is added to the gas from the regenerator material as the gas passes through the regenerator. Expansion and heat addition again take place in the hot cylinder to begin another cycle. Depending upon the temperature levels of these two spaces, there will be a mechanical work output or input equal numerically to the difference between the heat supplied and rejected. Since the device just described would require one piston to pause while the other piston moved, such an ideal device is considered impractical. The movement of the two pistons in the ideal device can be rather closely approximated, however, by selecting a favorable volume ratio between the two cylinders and having the two pistons out of phase with one another with the phase relationship depending upon the volume ratio and clearance volumes between piston and cylinder end. Normally, the phase relationship between the pistons is 90 degrees and this phase relationship is preferred and the only one discussed herein, although other phase relationships are possible and workable.

Regenerative gas cycles can operate both as prime movers and as refrigerators. In fact, these are only two out of four possible basic functional conditions, differing from each other according to prevailing temperatures and directions of heat and mechanical energy transfer.

In the "hot" prime mover, or conventional prime mover, the heat is supplied at a relatively high temperature, heat is rejected approximately at environmental temperature, and power is delivered by the machines at a crankshaft. The over-all effect, therefore, is that heat energy is degraded from a high to a low temperature level and consequently produces mechanical energy.

The regenerative thermal machine can also function as a "cold" prime mover. Heat energy is supplied to the machine at environmental temperature and rejected at a much lower temperature. In this machine, heat energy is dropped from atmospheric temperature to a low level, so that mechanical energy is produced. Such machines can use the cooling effect of evaporating liquid gases, recovering the energy expended for their liquefaction.

When operation corresponds to a conventional refrigerator, heat is absorbed by the machine at a temperature below that of the heat rejection, which is approximately environmental. Heat energy is pumped up from a low to a high temperature level, and mechanical energy must be supplied to the machine at the crankshaft to maintain the process.

A fourth type is a machine which takes in heat near environmental temperature and rejects it at a high level. By analogy with a hydraulic system, it is called a "heat pump," since mechanical energy must be supplied to the machine at the crankshaft to "pump up" heat to a higher temperature level. Machines of a similar type, but with vapor-compression cycles, are used for space heating.

The thermal devices discussed above are based on so-called "closed" thermodynamic cycles. This term indicates that, apart from incidental leakage past the piston, no inlet or exhaust process is involved, and an identical mass of gas is used again and again. In contrast, open-cycle machines replace at least a substantial portion of the working fluid during each cycle but, in all other respects, the thermodynamic cycle is the same as in the closed-cycle machines. The only significant difference is that one or more phases are now performed outside the mechanism, for example, in the atmosphere. Valves are used in the compression space. Air, entering through a valved intake in the cooled compression space, is compressed and pushed through a second valve into the regenerator. The air leaves the regenerator through a valve into the heated expansion space and is discharged to atmosphere through a valved discharge port after passing through the regenerator again. The regenerator is rotated once each cycle so that the air passing from the cooled space to the heated space gains the heat discharged into the regenerator as the air is exhausted from the heated space. The open-cycle thermal device is not particularly good as a source of power, but such machines function rather well as cooling, warming, or dehumidifying devices. The open cycle machine is also useful as an air compressor.

According to this invention, two (or more) double acting pistons rotatably mounted on the eccentric of a crankshaft are disposed in a rotating cylinder block and the device is operated on a regenerative thermal cycle. The pistons can be readily positioned to provide the 90 degree phase relationship required for the thermal cycle. The 90 degree phase relationship eliminates any dead spot in the linkage transmitting motion between the crankshaft and cylinder block and provides perfect balance of the rotating forces, leaving only a small rotating couple to be balanced by counterweights. Each double-ended piston, then, rotates around an eccentric on the crankshaft and is supported by a bearing at the eccentric; thus there is very little reaction between the piston and cylinder walls except for that caused by fluctuating gas forces and friction of the rotating parts. Large piston side forces attributed to Coriolis acceleration do not exist in this machine. Also, all the parts, namely the crankshaft, piston, and cylinder blocks, are constant-speed members and all act as fly-wheel masses to absorb variations in the torque from the cyclic gas pressures.

Briefly, this invention comprises apparatus for a regenerative thermal device including a cylinder block rotatably mounted to rotate about a first axis, a plurality of cylinders supported by the cylinder block, a crankshaft rotatably mounted to rotate about a second axis, a plurality of pistons reciprocably disposed in the cylinders and rotatably mounted on cranks on the crankshaft, and means including a regenerator for connecting the cylinders to operate on a regenerative cycle.

Figure 1:
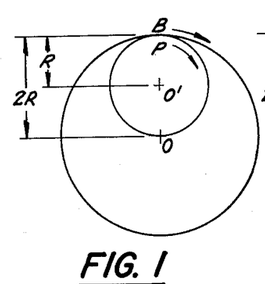
FIGS. 1–5 are diagrams showing the geometric relations that are the fundamentals of the construction of the apparatus of this invention.

FIGS. 1 through 5 show the fundamental relationships upon which the apparatus of this invention is based. In FIG. 1 there are two circles having centers at 0 and 0' with the large circle having twice the radius of the small circle. The circles are tangent at a point P on the small circle and at a point B on the large circle. Both circles are rotated about their respective fixed centers without allowing any slip to occur between them. It will be seen that as this process is continued, the point P on the small circle traces a straight line across the large circle that passes through the center of the large circle. After one revolution of the small circle and one-half revolution of the large circle the point P has traced a complete diameter of the large circle.

Figure 2:
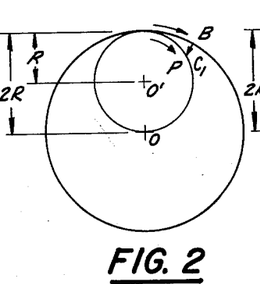
Figure 3:
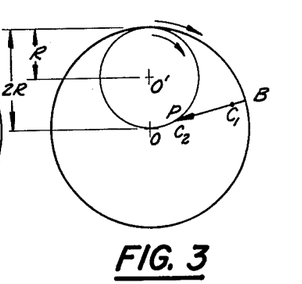
Figure 4:
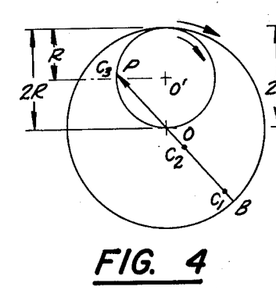
Figure 5:
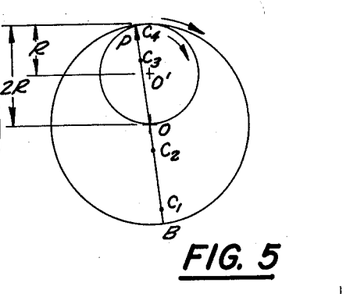

Progressing from FIG. 1 to FIG. 5, it is shown that in FIG. 2 the small circle has rotated about 60 degrees and the large circle about 30 degrees with the point P having traced the line from B to $C_1$. In FIG. 3, the small circle is approaching 180 degrees of rotation while the large circle is approaching 90 degrees of rotation. From its position in FIG. 2, point P has moved from $C_1$ to $C_2$. FIG. 4 shows the small circle as having rotated 270 degrees and the large circle has rotated 135 degrees. Since FIG. 3 point P has moved along a straight line from $C_2$ through the center 0 of the large circle to point $C_3$. FIG. 5 shows the result as one rotation of the small circle and one-half rotation of the large circle are about to be completed. The point P has almost completed tracing a diameter of the large circle having passed from point B to $C_4$ during rotation of the circles. As the small circle is rotated a second time and the large circle completes the second half of its first rotation, the point P on the small circle will retrace the same line through the center 0 of the large circle back to the point B.

Figure 6:
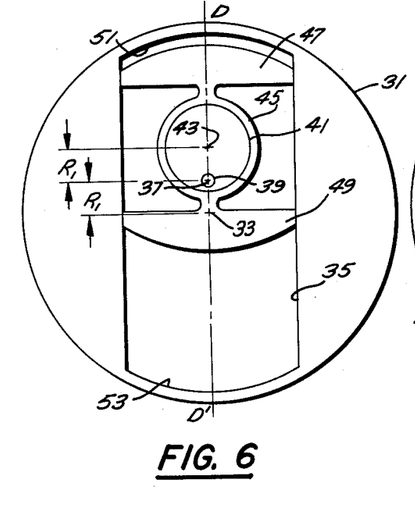
FIGS. 6–9 are diagrams of a simplified construction that operates according to the geometric relations shown in FIGS. 1–6.

FIGS. 6 through 9 are diagrams of a simplified device that operates according to the geometric relation shown in FIGS. 1 through 5. In FIG. 6, a cylindrical block 31, having an axis of rotation 33, has a cylindrical bore 35 with the central longitudinal axis D—D' of the cylindrical bore 35 passing through the axis 33 of the block 31. The axis of rotation 37 of a crankshaft 39 is located a distance $R_1$ from the axis 33. An eccentric such as a crank 41 is mounted on the crankshaft 39 and has its center 43 positioned a distance $R_1$ from the axis 37 of the crankshaft 39. A ring 45 surrounds the crank 41 and supports the pistons 47 and 49. The axis 33 of the block 31 and the axis 37 of the crankshaft 39 correspond to the centers 0 and 0', respectively, of the large and small circles of FIGS. 1 through 5. The center 43 of the crank 41 corresponds to the point P of FIGS. 1–5.

Figure 7:
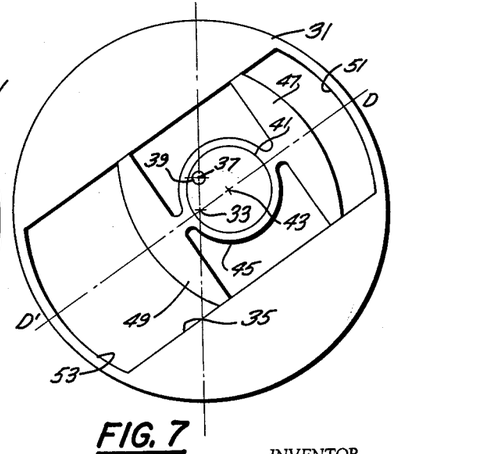

The ring 45 is free to rotate on the crank 41 so that when the block 31 rotates about its axis 33 and the crankshaft 39 rotates about its axis 37, the pistons 47 and 49 reciprocate in the bore 35. FIG. 7 shows the block 31 rotated slightly in excess of 45 degrees and the crankshaft 39 rotated slightly more than 90 degrees. The piston 47 has moved away from the one end 51 of the bore 35 as piston 49 moves toward the opposite end 53 of the bore 35. The center 43 of the crank 41 stays on the longitudinal axis D—D' of the bore 35 as the axes 33 and 37 remain fixed centers of rotation.

Figures 8, 9, 10:
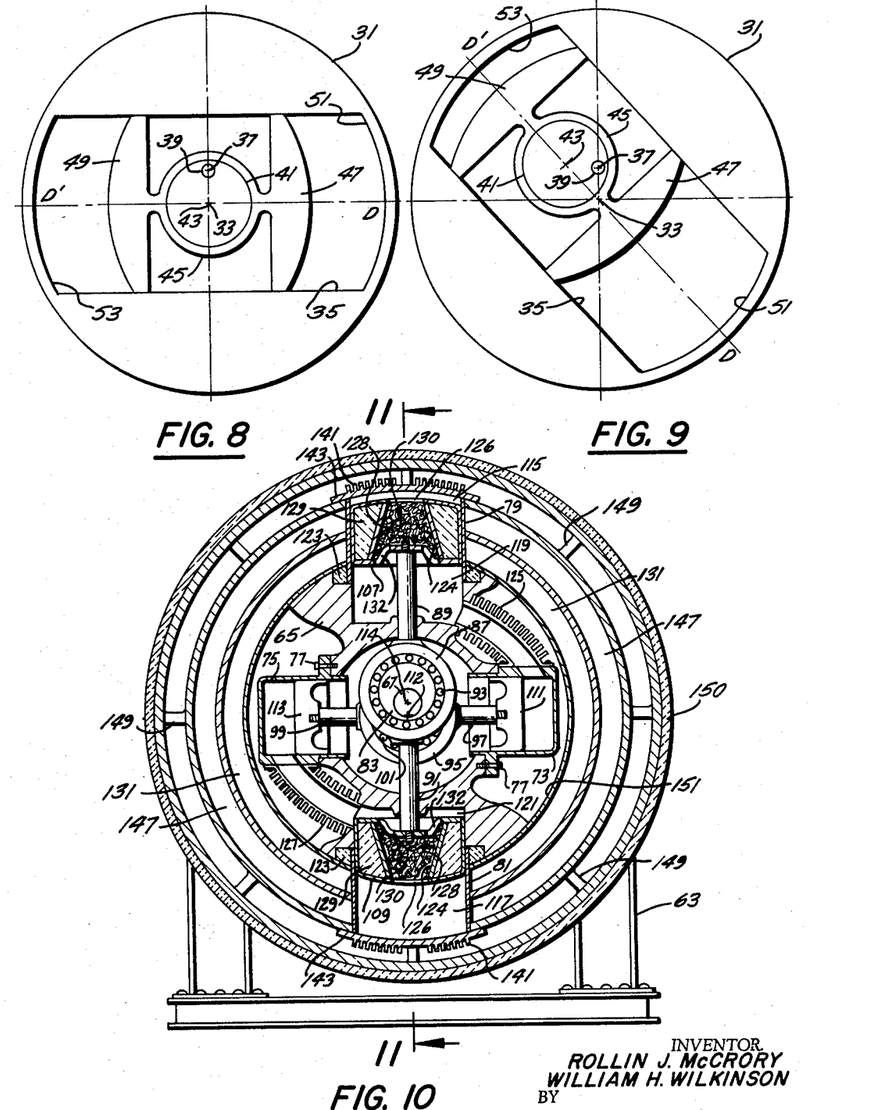
FIG. 10 is a sectional view of one example of apparatus taken along the line 10—10 of FIG. 11.

FIG. 8 shows the block 31 rotated 90 degrees and the crankshaft 39 rotated 180 degrees. The center 43 of the crank 41 remains on the longitudinal axis D—D' of the bore 35 and at the indicated position, coincides with the axis 33 of the block 31. The pistons 47 and 49 are in midstroke.

FIG. 9 shows the block 31 rotated about 135 degrees and the crankshaft 39 rotated about 270 degrees. Piston 49 is approaching the end 53 of bore 35 and piston 47 has almost completed an expansion stroke. A stroke of the pistons 47 and 49 in one direction is completed on each half rotation of cylindrical block 31 as the crankshaft 39 completes one rotation. The pistons 47 and 49 complete a stroke in each direction on one rotation of cylindrical block 31 and two rotations of crankshaft 39. If proper forces are applied to the pistons 47 and 49 the force will be transferred to the crank 41 thereby rotating the crankshaft 39 and the block 31.

Figure 11:
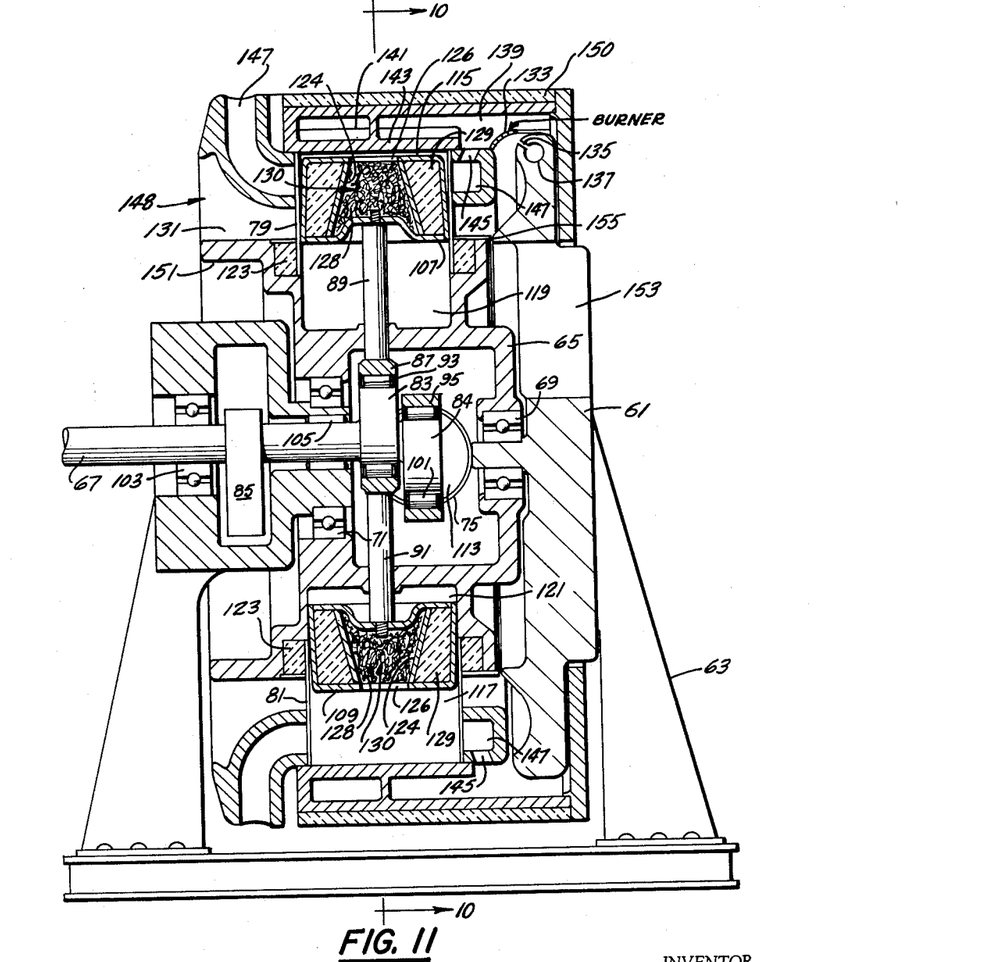
FIG. 11 is a sectional view of the apparatus taken along the line 11—11 of FIG. 10.

FIGS. 10 and 11 show an example of a device according to the invention that functions in a manner similar to the device shown in the diagram of FIGS. 6 through 9. The forces for operation are obtained from a regenerative thermal cycle. A frame 61 having a base 63, supports a cylinder block 65 and a crankshaft 67. The cylinder block 65 is rotatably mounted on the frame 61 by suitable means such as bearings 69 and 71.

The cylinder block 65 supports two cylinders 73 and 75 that are attached to the cylinder block 65 by suitable means such as bolts 77—77. Two additional cylinders 79 and 81 are supported by the cylinder block 65.

Attached to the crankshaft 67 are cranks 83 and 84 and a counterweight 85 which rotate with the crankshaft 67. A ring 87 having two rods 89 and 91 attached thereto is rotatably mounted by means of bearings 93 on crank 83. Similarly, a ring 95 having rods 97 and 99 attached thereto is rotatably mounted by means of bearings 101 on crank 84. The crankshaft 67 is supported by the frame 61 and is rotatably mounted thereon by suitable means such as bearings 103 and 105. Displacers 107 and 109 are attached to the ends of rods 89 and 91, respectively. Pistons 111 and 113 are attached to the ends of rods 97 and 99, respectively.

The various members that rotate with respect to the frame 61, include: the cylinder block 65, crankshaft 67, the unit of displacers 107 and 109, and the unit of pistons 111 and 113. The cylinder block 65, rotates about its axis 112 and the crankshaft rotates about its axis 114. The present rotational position of the device shown in FIG. 11 may be compared to the positions of the device shown in diagram of FIGS. 6-9. The position of the displacers 107 and 109 in FIG. 11 is comparable to the position of the pistons 47 and 49 of FIG. 6. The positions of the pistons 111 and 113 of FIG. 11 is comparable to the positions of the pistons 47 and 49 in FIG. 8. Displacers 107 and 109 are at one end of their stroke while pistons 111 and 113 are at midstroke, thus displacer 107 is ninety degrees out of phase with piston 111 and displacer 109 is ninety degrees out of phase with piston 113. The crankshaft axis 114 is positioned a predetermined distance from cylinder block axis 112 and the centers of cranks 83 and 84 are positioned the same predetermined distance from crankshaft axis 114.

Cylinders 79 and 81 are each divided by displacers 107 and 109 into hot spaces 115 and 117, respectively, and cool spaces 119 and 121, respectively. The hot spaces 115 and 117 are toward the outer periphery of the cylinder block and the cool spaces 119 and 121 are toward the center of the cylinder block. Around the outside of each of the cylinders 79 and 81, a thermal barrier is provided in the form of a ring of insulation 123. Cool space 119 communicates with cylinder 73 through a heat exchanger 125 and cool space 121 communicates with cylinder 75 through a heat exchanger 127.

The outer end of displacers 107 and 109 have an opening 126 leading to a passage 124 filled with a material such as wire mesh 128 to form a regenerator 130 which connects hot space 117 to cool space 121 and hot space 115 to cool space 119 through an additional opening 132 on the inner ends of displacers 107 and 109. The remainder of the displacers 107 and 109 are filled with an insulating material 129.

The cylinder block 65 is provided with a plurality of annular passages. Precombustion air enters the precombustion chamber 131 and passes around the cylinders 79 and 81 to a plurality of burners 133—133 (only one shown in FIG. 11) where the precombustion air is mixed with fuel from small ports 135—135. Each port 135 releases the fuel from a fuel supply line 137 in the frame 65. Each burner 133 is attached to the frame 65 spanning the gap between the frame 61 and the cylinder block 65 so that combustion takes place above the burner in the combustion chamber 139. A plate 143 having a plurality of fins 141—141 caps each of the cylinders 79 and 81 and aids in adding the heat of combustion to the spaces 115 and 117 within the cylinders 79 and 81. The combustion gases escape through a plurality of ports 145—145 (one of which is shown in FIG. 11) into an exhaust passage 147. A plurality of fins or similar apparatus (not shown) may be provided at the entrance 148 of the precombustion chamber 131 so that the combustion air may be forced through the passages 131, 139, and 147. As the exhaust gases leave the cylinder block through the exhaust passage 147, they pass around the cylinders 79 and 81 adding additional heat to the hot spaces 115 and 117. A plurality of connecting pieces such as support members 149 are positioned between the walls of the combustion chamber 147 to reinforce the cylinder block 65. A ring 150 of insulating material surrounds the periphery of the cylinder block 65 to retain the heat in the combustion chamber 139.

Cooling air is passed around the cylinders 73 and 75 through the central opening 151 in the cylinder block 65. Here again the air may be forced through the center of the cylinder block by fins positioned on one side of the cylinder block so that the rotation of the cylinder block "fans" the air through the central opening 151. A plurality of spokes 153 are provided in the frame to allow the cooling air to escape. The cooling air passage 151 is maintained separate from the combustion air passage 131 by an annular projection 155 on the frame 61 extending close to the cylinder block 65.

Assuming that the device of FIGS. 10 and 11 is rotating clockwise as shown in FIG. 10, so that piston 111 is moving away from the head end of cylinder 73 and displacer 107 is moving away from the head end of cylinder 79, piston 111 is a half stroke ahead of displacer 107 or ninety degrees out of phase. As displacer 107 reciprocates within the cylinder 79, the working fluid passes through the regenerator 130. Heat is stored in the regenerator 130 as the displacer 107 moves toward the head end of the cylinder 79 and heat is given up from the regenerator 130 to the working fluid as the displacer 107 moves away from the head end of the cylinder 79. The working fluid also passes through the heat exchanger 125 as the piston 111 reciprocates in cylinder 73.

The movements of displacer 107 and piston 111, along with the heating and cooling conditions all of which are provided by the construction of the apparatus, comprise a regenerative cycle that produces mechanical energy for rotating the various parts of the device clockwise, as shown in FIG. 10, resulting in useful work output at the crankshaft 67. Note that when the piston 111 is furthest away from the head end of cylinder 73, the displacer 107 is in midstroke so that the working fluid is being expanded and cooled. When piston 111 is at midstroke and moving toward the head end of cylinder 73, the working fluid is being compressed and heated.

One advantage of this device is that the pressure on either side of piston 107, i.e., in hot space 115 and cool space 119, remains relatively equal throughout the cycle. The pressure times the volume of the working fluid reaches its maximum while the piston 111 is moving away from the head end of cylinder 73 and reaches its minimum while the piston 111 is approaching the head end of cylinder 73. The work output of the system is applied to the pistons 113 and 111. Pistons 109 and 113 operate in the same manner as pistons 107 and 111 except that they are 180° out of phase with pistons 107 and 111 in the regenerative cycle.

Figure 12:
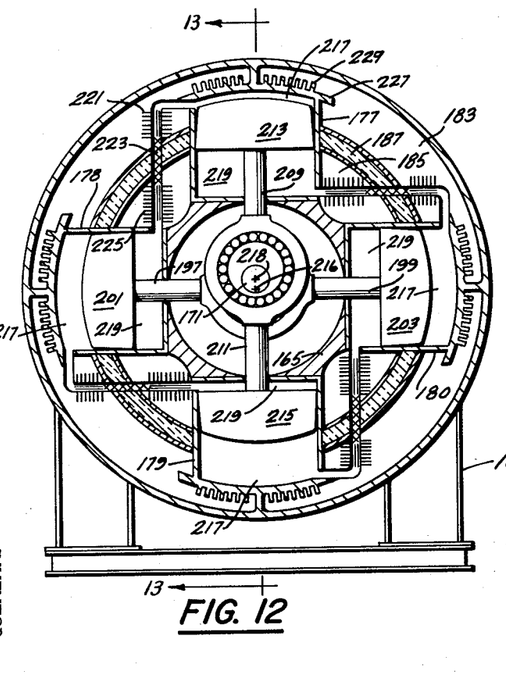
FIG. 12 is a sectional view of another example of apparatus taken along the line 12—12 of FIG. 13.
Figure 13:
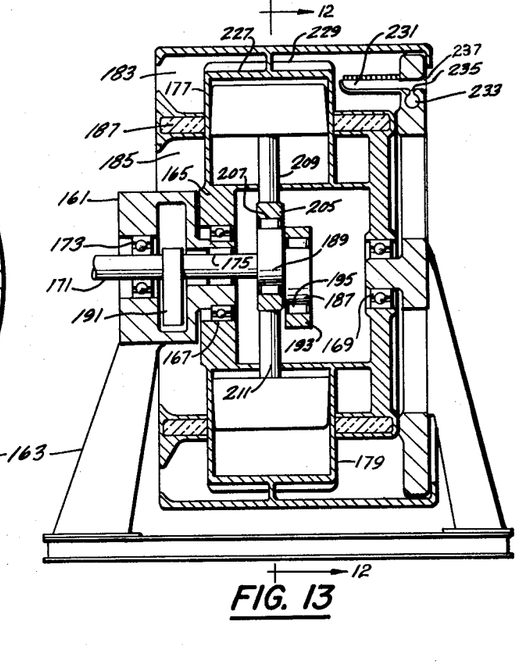
FIG. 13 is a sectional view of the apparatus taken along the line 13—13 of FIG. 12.

A second example of a regenerative thermal device according to the invention is shown in FIGS. 12 and 13. A frame 161 having a base 163 supports a cylinder block 165 rotatably mounted on the frame 161 by suitable means such as bearings 167 and 169. The frame 161 additionally supports a crankshaft 171 rotatably mounted on the frame 161 by suitable means such as bearings 173 and 175.

The cylinder block 165 supports four cylinders 177, 178, 179, and 180. The cylinder block is also divided into an outer heated passage 183 and an inner cool passage 185. Since the passages 183 and 185 are provided for air at divergent temperatures, they are separated by a wall 187 of insulating material.

The crankshaft 171 has fixedly mounted thereon two cranks 187 and 189 and a counterweight 191. Crank 187 has a ring 193 rotatably mounted thereon by means of bearings 195 with the ring 193 attached to rods 197 and 199 which support double-acting pistons 201 and 203, respectively. The double-acting pistons 201 and 203 reciprocate in cylinders 178 and 180, respectively. Crank 189 also supports a ring 205 rotatably mounted by means of bearings 207. Ring 205 has rods 209 and 211 fixedly mounted thereto which support double-acting pistons 213 and 215, respectively, with piston 213 reciprocating in cylinder 177 and piston 215 reciprocating in cylinder 179.

With the cylinder block 165 rotating about its axis 216 and the crankshaft 171 rotating twice as fast about its axis 218 the pistons 201, 203, 213, and 215 are reciprocated with adjacent pistons (201–213, 213–203, 203–215, and 215–201) 90° out of phase with each other. Each piston divides the cylinder that it operates in into a varying sized chamber or hot space 217 and varying sized chamber or cold space 219. The hot space 217 of each cylinder is connected to the next adjacent cold space 219 in a counterclockwise direction as the device is shown in FIG. 12. The passage between the hot space 217 and the next adjacent cold space 219 includes a heater 221, a regenerator 223, and a cooler 225. Each of the cylinders 177–180 is provided with a cap 227 having a plurality of fins 229—229.

At least one burner 231 is provided in the warm air passage 183 and is attached to the frame 161. A fuel chamber 233 in the frame 161 releases fuel to the burner 231 through a small port 235. Air is supplied to the burner through an opening 237 in the frame 161. As the cylinder block 165 rotates, heat from the burner 231 is supplied to the hot air passage 183 heating the working fluid in the hot air chambers 217—217 mainly through the caps 227—227 and the heat exchangers 221—221. Cooling air enters the cool air passage 185 to cool the air in the cold chambers 219 and additionally cools the air by passing over the heat exchanger or cooler 225.

When the device shown in FIG. 12 is rotated in a counterclockwise direction (as shown in FIG. 12), the working fluid is expanded and heated in the variable size chambers 217—217 and compressed and cooled in the variable size chambers 219—219. In a counterclockwise direction then, the device will function as a hot prime mover. Heat will be added as the working fluid passes through the heat exchangers 221—221 and rejected as the working fluid passes through the heat exchangers 225—225. The regenerators 223—223 store heat from the working fluid as it is shuttled back and forth from the hot space 217 and cold space 219.

Assuming that the burner 231 is shut off and rotative energy applied at the crankshaft in a counterclockwise direction, the working fluid in the chambers 217—217 continue to absorb heat. Under these conditions, the chambers 217—217 are not hot, but drop below environmental temperatures and the apparatus of FIG. 12 becomes a refrigerating device so that air passed through the passage 183 is cooled to a low temperature.

If mechanical energy is applied to the crankshaft so that the apparatus as shown in FIG. 12 is rotated in a clockwise direction, the chambers 217 become hot again emitting heat, so that the apparatus functions as a heat pump.

Finally, when a fluid below an environmental temperature is passed through the passage 183, the temperature difference between chambers 217—217 and chambers 219—219 results in mechanical energy output in a clockwise direction so that the apparatus of FIG. 12 becomes a cold prime mover.

Figure 14:
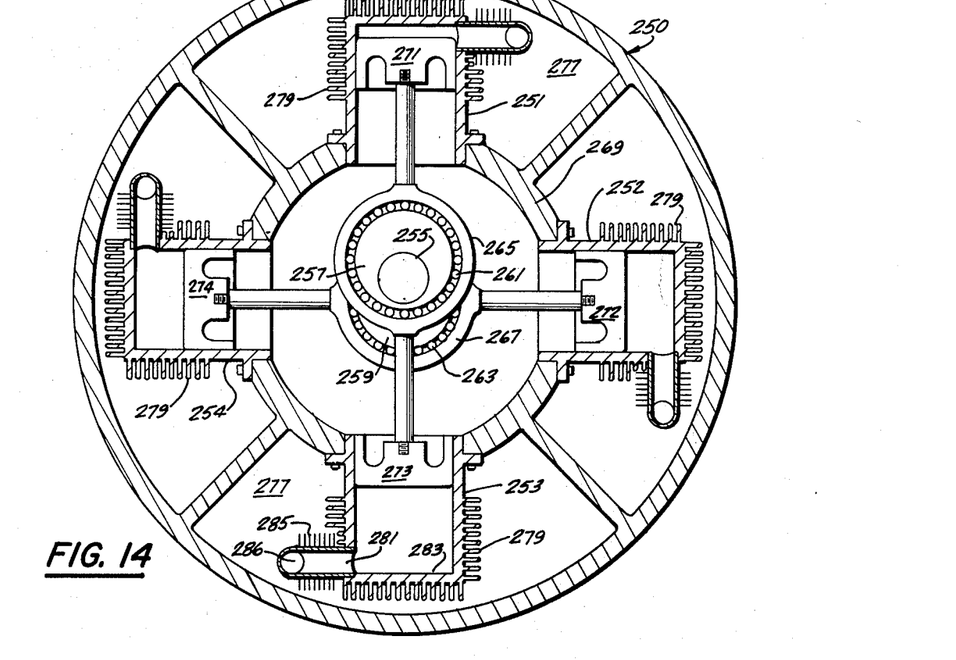
FIG. 14 is a sectional view of still another example of apparatus taken along the line 14—14 of FIG. 15.

FIG. 14 shows another example of the apparatus according to this invention. The apparatus shown is a component for a regenerative thermal device and the cylinders 251, 252, 253, and 254 are all of the same type, i.e., all hot or all cold. The basic configuration of the component 250 is comparable to that of FIGS. 10, 11, 12, and 13 with the crankshaft 255, cranks 257 and 259, bearings rings 261 and 263, rod support rings 265 and 267, and cylinder block 269 much the same. Piston 271 is 90° out of phase with piston 272; piston 272 is 90° out of phase with piston 273; and piston 273 is 90° out of phase with piston 274.

Heating or cooling air is forced through the annular opening 277 in the cylinder block 269. The cylinders 251-254 are provided with fins 279—279 on their outer surface to facilitate heat transfer. An outlet 281 is provided at the closed end 283 of each cylinder 251-254 leading to a heat exchanger 285 and from the heat exchanger 285 to a regenerator (not shown) and then to the exterior of the cylinder block 269 by means of an opening 286.

Figure 15:
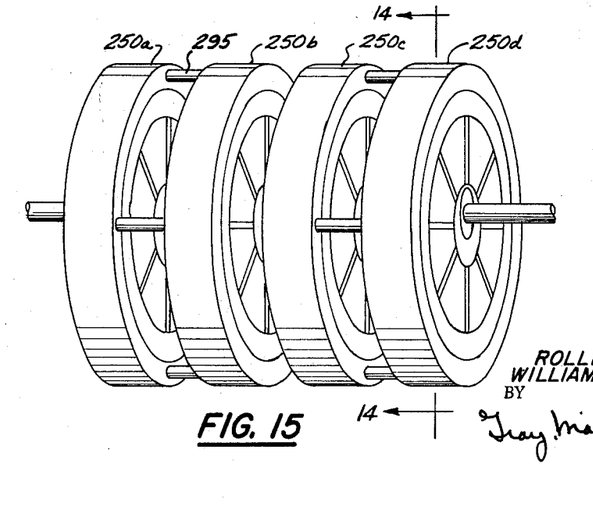
FIG. 15 is a perspective view showing a multiple arrangement of the unit shown in FIG. 14.

FIG. 15 shows an arrangement of components 250a, 250b, 250c, and 250d with each component comparable to the component 250, shown in FIG. 14 in which each cylinder 251a–254a of the first component 250a is selectively connected by a duct 295 (containing a regenerator not shown) across to a cylinder 251b–254b of a second component 250b, so that the pistons of the connected cylinders are 90° out of the phase with each other. The third component 250c and fourth component 250d are connected in a similar manner. Two of the connected components, for example 250a and 250b function as a prime mover (with the cylinders of component 250a heated and the cylinders of component 250b cooled) for driving the other two components 250c and 250d which function as a refrigerator (with the cylinders of component 250c warm and the cylinders of component 250d cold).

Figure 16:
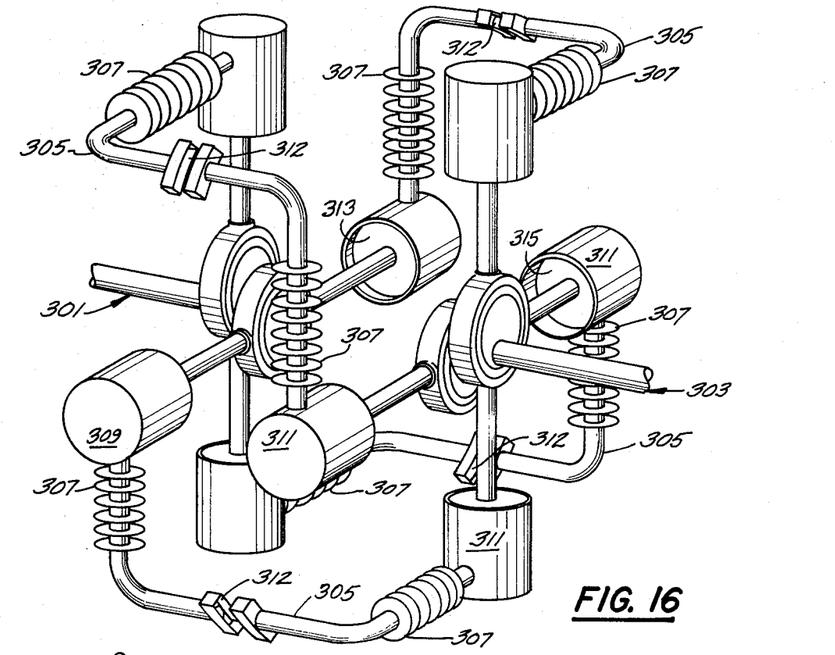
FIG. 16 is a perspective view of two of the units shown in FIG. 14 with portions of the device omitted for clarity.

FIG. 16 is a perspective view of two components 301 and 303 with the frames and cylinder blocks stripped away. A plurality of ducts 305, including heat exchangers 307 and regenerators (not shown) within the ducts 305, connect the cylinders 309 of component 301 to cylinders 311 of component 303. At the point where each duct 305 passes from the cylinder block of component 301 to the cylinder block of component 303, an enlarged opening 312 is provided so that even though the components 301 and 303 are partially rotated relative to one another the cylinders 309—309 will still be connected with the cylinders 311—311. For convenience and clarity a slight separation is shown between the openings 312 but as actually constructed the openings 312 fit tightly against one another as shown in FIG. 17.

When the cylinders 309 and 311 of the components 301 and 303 are properly connected in pairs to each other, each piston 313 is 90° out of phase with the piston 315 to which it is paired so that each set of connected cylinders 309 and 311 comprise a regenerative thermal unit. A slight alteration of the alignment of the components 301 and 303 causes a shift in the 90° phase relationship of the pistons 313 and 315 in each of the cross connected cylinders 309 and 311. This phase shift reduces the efficiency of the regenerative cycle and provides a modulating control for the combined components 301 and 303 when the components are paired together as a prime mover. The partial rotation of one component relative to the other is about 2 to 10 degrees.

Figure 17:
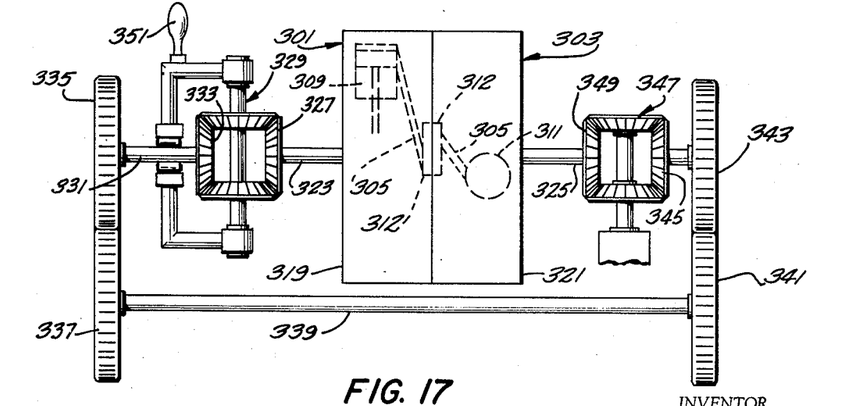
FIG. 17 is a plan view of apparatus for modulating the power output of two units of FIG. 14 combined for use as a prime mover.

FIG. 17 shows an example of a construction used to alter the alignment of components 301 and 303 bringing about the desired modulating effect. Cylinder block 319 of component 301 and cylinder block 321 of component 303 are pressed tightly together so that the components 301 and 303 rotate together as a regenerative thermal device. Cylinders 309—309 communicate with cylinders 311—311 through ducts 305—305 connected to slots 312—312. The crankshaft 323 of component 301 is connected to crankshaft 325 of component 303 indirectly through a series of gears. A gear 327 on crankshaft 323 is engaged with a rotatable gear cage 329 which rotates an axle 331 having a gear 333 engaged with gear cage 329. A gear 335 attached to axle 331 engages a gear 337 which rotates another axle 339 having a gear 341 at its opposite end. Gear 341 engages and rotates gear 343 connected to crankshaft 325 through a gear 345, stationary gear cage 347, and gear 349. Rotation of rotatable gear cage 329 by means such as handle 351 rotates component 303 relative to component 301 through the gear connections so that the pistons 313—313 are thrown slightly out of their 90° relationship with the corresponding pistons 315—315.

The method of modulation just described is much quicker than methods of modulation which depend upon changing the heat input to the cylinders of the hot side of the regenerative cycle.

Figure 18:
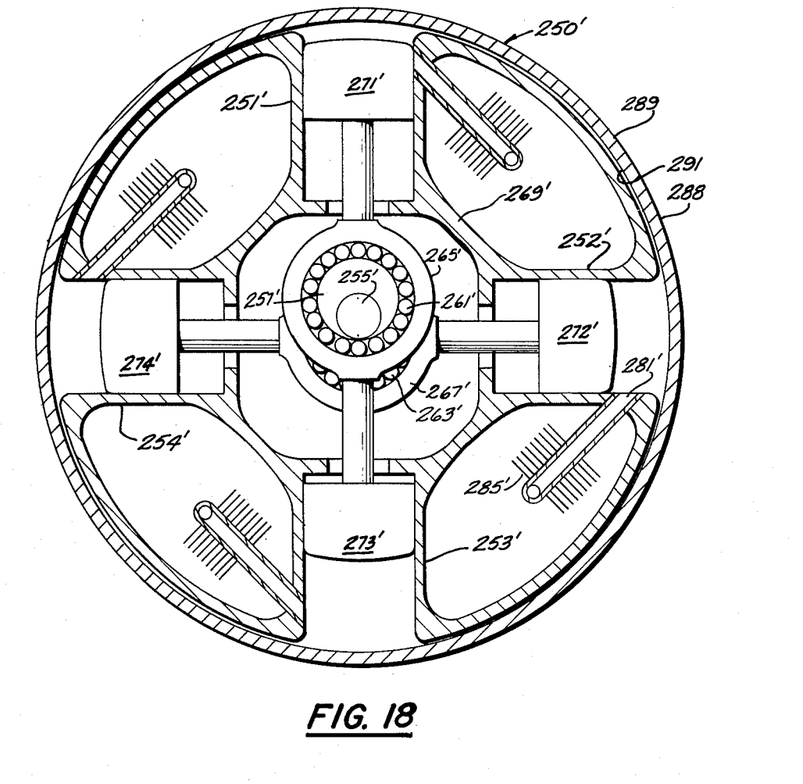
FIG. 18 is a sectional view of apparatus similar to that shown in FIG. 14.

FIG. 18 shows a component for a regenerative thermal device much like that of FIG. 14 except for the cylinder head or closed end of each cylinder 251'–254'. The closures 283—283 for the cylinders 251-254 of FIG. 14 are replaced by a continuous cylinder head such as the ring 288. When the cylinder block 269 is rotated, the ring 288 is attached to the frame (not shown) and remains stationary. The construction has a number of advantages from the standpoint of heat transfer. The ring 288 is heated or cooled on its exterior surface 289 and the working fluid contacts the interior surface 291. Instead of the working fluid being exposed to a normal cylinder head area, the fluid is being moved along by the cylinders to a different position along the ring 288 effectively increasing the area of the cylinder head. Thus as heat is absorbed from (or released to) a particular area of the ring 288, the working fluid is moved on to a hotter area (or cooler area, as the case may be) so that the temperature difference between the working fluid and ring 288 is maintained at a maximum level facilitating the rate of heat transfer. Since the ring 288 is stationary while the cylinder block 269' rotates, the relative movement of the block 269' to the ring 288 further causes vortices within the working fluid. These vortices, or swirling of the working fluid, also facilitate heat transfer by increasing the movement of the working fluid at the inner surface 291 of the ring 288.

Regenerative thermal units are also made up from components 250'—250' similar to those made of components 250—250 of FIG. 14. Each component 250' of a regenerative thermal unit receives the temperature treatment that is consistent with its place in the type of regenerative thermal unit it comprises.

Figure 19:
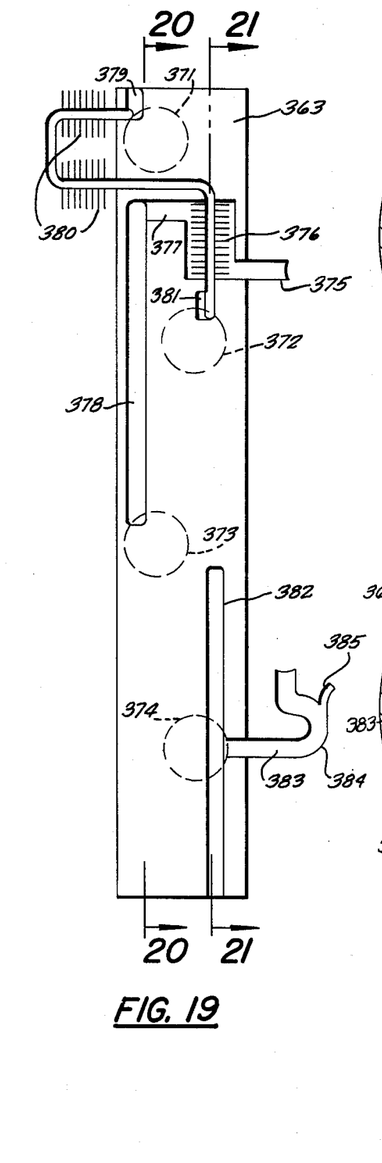
FIG. 19 is a diagram of a flattened port ring that encircles the cylinder block of an open cycle system according to this invention.
Figure 20:
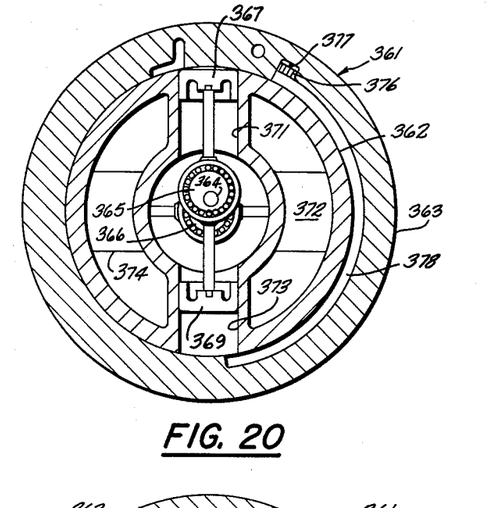
FIG. 20 is a sectional view of a device according to the diagram of FIG. 19 and taken at the lines 20—20 of FIG. 19.
Figure 21:
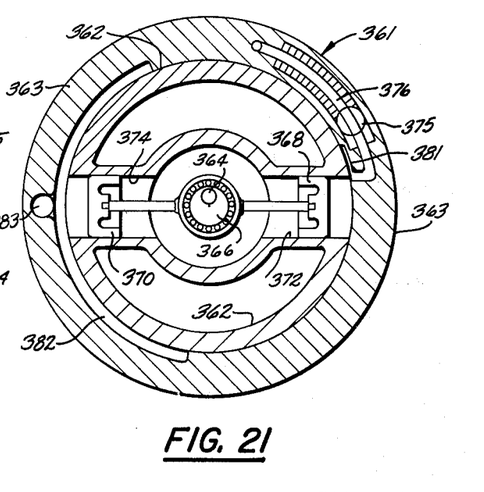
FIG. 21 is a sectional view of the device of FIG. 20 taken at the lines 21—21 of FIG. 19.

FIGS. 19, 20, and 21 show the construction of an open cycle thermal regenerative device. In the open cycle device the working fluid is replaced on each regenerative cycle instead of being reused over and over as it was in the devices previously described herein. In order for the open cycle unit to function properly, valves must be provided so that the working spaces are closed during a portion of the cycle and open at other times to take in or discharge working fluid.

The unit 361 shown in FIGS. 19, 20, and 21 has a cylinder block 362 that rotates in the usual manner but inside a port ring 363 that is stationary similar to the ring 288 of FIG. 18. A crankshaft 364 supports two eccentrics 365 and 366 having pistons 367 and 369 and pistons 368 and 370, respectively, rotatably mounted thereon. Rotation of the crankshaft 364 and cylinder block 362 causes reciprocation of pistons 367-370 within compression cylinders 371, 373, and expansion cylinders 372, 374.

FIG. 19 is a diagram of the port ring 363 as it would appear if the port ring 363 were cut transversely and laid out flat. FIG. 20 is a cross section through the unit 361 along the line 20—20 and FIG. 21 is a section taken through the unit 361 along the line 21—21.

The unit 361 as shown in FIGS. 19, 20, and 21 is constructed as a refrigerating device for cooling air and rotates clockwise. Air from the area being refrigerated enters the unit 261 through an air intake duct 375, passes over a regenerative heat exchanger 376, through a duct 377, to an elongated inlet port 378. At the present position of the cylinder block 362 within the port ring 363, the intake port 378 communicates with compression cylinder 373. The piston 369 in compression cylinder 373 is at bottom dead center position and has just completed its intake stroke.

The air, after entering cylinder 373 is compressed as the cylinder block 362 rotates. Cylinder 373 moves along the port ring 363 until it registers with crossover port 379. In FIGS. 19, 20, and 21 cylinder 371 is at port 379 and piston 367 has completed compression and forced the air through crossover port 379, heat exchanger 380, regenerative heat exchanger 376, and crossover port 381 into cylinder 372. The air, being compressed in compression cylinders 371 and 373, gains heat. The air is first cooled by atmospheric air in heat exchanger 380 and further cooled by refrigerator air in regenerative heat exchanger 376. The incoming refrigerator air is thus heated by the compressed air so that by the time the incoming refrigerator air is compressed and eventually reaches heat exchanger 380 there is a good temperature differential between the compressed air and atmospheric air.

The air completes its entry into cylinder 372 when piston 368 is at about midstroke and is expanded until the piston 368 reaches bottom dead center position. Bottom dead center position is attained by each piston 368 and 370 when their respective cylinders 372 and 374 reach a position on the port ring that is transverse to the position of cylinder 373 as presently shown. At this time the cylinder 372 or 374 communicates with exhaust port 382. The air passes from the port ring through an exhaust duct 383 having a sharp bend 384. The sharp bend 384 aids in collecting water that has condensed due to cooling the air and the water is separated from the air passing to the refrigerator space by a small duct 385 positioned in the bend 384 of duct 383.

Figures 22, 23:
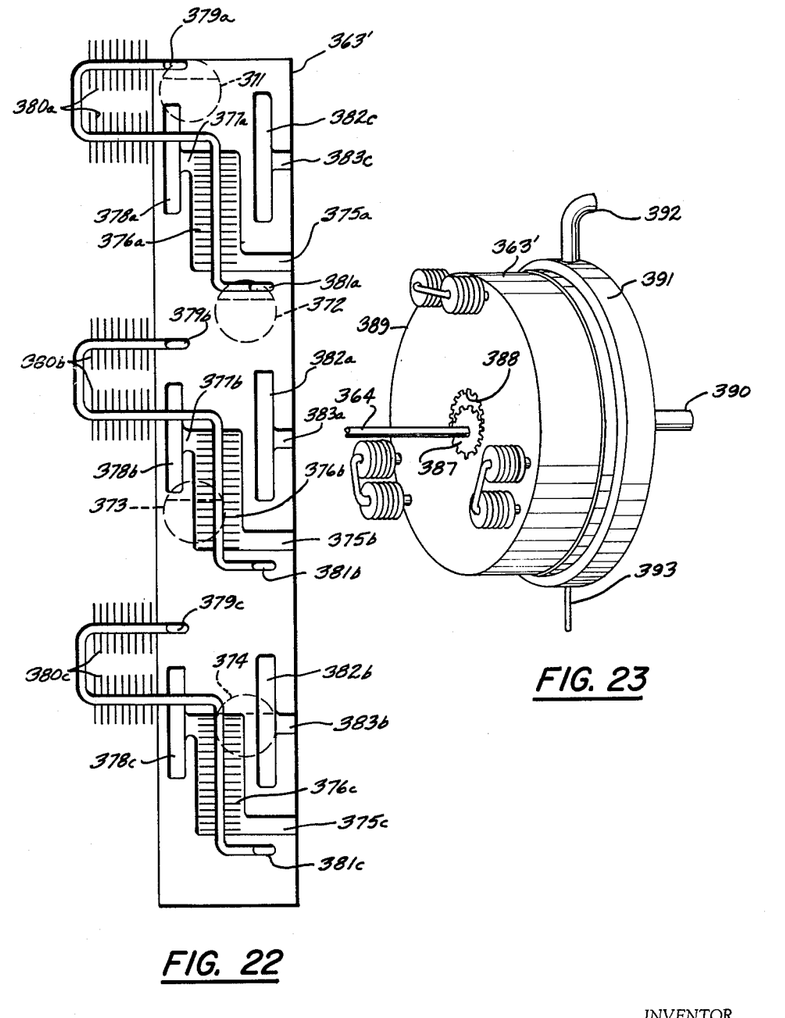
FIG. 22 is a diagram of a flattened port ring for an open cycle system that rotates with the cylinder block but at a different rate of rotation.
FIG. 23 is a perspective view showing the construction for rotating the port ring shown in FIG. 22.

FIG. 22 is a diagram showing another port ring that is also flattened for clarity. The port ring 363' has a plurality of ports and heat exchangers and rotates in the same direction as the cylinder block 362. The ratio of rotational speed between the cylinder block 362 and multiple port ring depends upon the number of port sets embodied in the port ring 363'. Comparing FIG. 22 to FIG. 19, note that there are three sets of ports provided in the port ring 363' with like ports having the sub-letters a, b, and c. The ratio of port ring rotations to cylinder block 362 rotations is 2 to 3. The cylinder block rotates three times while the port ring rotates two times. Since the cylinders are opposite the same point in the port ring 363' three times as long, the lengths of the inlet outlet and crossover ports are only one-third as long as in the stationary port ring 363, and the distances between ports (except the distance between the two crossover ports 379 and 381) are one-third as long as in the stationary port ring 363. The proper rotational ratio between the port ring 363' and cylinder block 362 is attained by a gear 387 on the crankshaft 364 that meshes with a gear 388 provided on the side 389 of the port ring 363'. Bearings (not shown) are also provided between the port ring and the frame (not shown) for support.

The intake ducts 375a, 375b, and 375c communicate with a common intake duct 390 and the exhaust ducts 383a, 383b, and 383c all communicate with a collector duct 391 that is provided with an exhaust outlet 392. The collector duct 391 is provided with a drain 393 to bleed off the water condensing from the cooled air.

Rotating the port ring 363' increases the efficiency of the open cycle device in a number of ways. The heat exchangers 380a, 380b, and 380c are rotated with the port ring 363' and the rotation provides an air flow over the heat exchangers 380a, 380b, and 380c increasing their heat transfer capability. Since the port ring 363' moves with the rotating cylinder block, the friction between these two members is reduced. The exhaust ducts may also be positioned so that the centrifugal force of rotation aids in separating the condensing water from the exhaust air.

The construction shown in FIGS. 22 and 23 is also valuable as a still for producing water from air. When used as a still, the heat exchangers 380a, 380b, and 380c are not absolutely necessary. The air is drawn from the surrounding atmosphere through the intake ducts 375a, 375b, and 375c and discharged to the surrounding atmosphere through ducts 383a, 383b, and 383c instead of being circulated through the device from a confined area when used as a refrigerator.

While there has been illustrated and described herein the preferred embodiment of the apparatus in more or less detail, it is realized that various modifications of the invention may be made without departing from the spirit and scope thereof and without the excercise of further invention. No attempt is here made to exhaust all such possibilities. It will be understood that the words used herein are words of description, rather than of limitation, and that various changes may be made without departing from the spirit or scope of the invention herein disclosed.

What is claimed is:

1. A regenerative terminal device comprising:
   (a) a cylinder block rotatably mounted to rotate about a first axis;
   (b) a plurality of cylinders supported by said cylinder block;
   (c) a crankshaft rotatably mounted to rotate about a second axis, said second axis being spaced from said first axis;
   (d) a plurality of pistons reciprocably disposed in said cylinders and rotatably mounted on cranks on said crankshaft; and
   (e) means including a regenerator for connecting said cylinders to operate on a regenerative thermal cycle.

2. A regenerative thermal device comprising:
   (a) a cylinder block rotatably mounted to rotate about a first axis;
   (b) a plurality of cylinders supported by said cylinder block;
   (c) a crankshaft rotatably mounted to rotate about a second axis, said second axis being spaced from said first axis;
   (d) a plurality of pistons reciprocably disposed in said cylinders and rotatably mounted on cranks on said crankshaft; and
   (e) passages including regenerator means connecting said cylinders in pairs, said cylinder block and crankshaft being arranged to impart reciprocation to said piston upon rotation about their respective axes, with the pistons in said cylinder pairs being out of phase with each other.

3. A regenerative thermal device comprising:
   (a) a cylinder block free to rotate about a first axis;
   (b) a crankshaft free to rotate about a second axis parallel to and spaced a predetermined distance from said first axis;
   (c) a plurality of cranks on said crankshaft, each said crank having its center spaced at said predetermined distance from said second axis;
   (d) a plurality of cylinders supported by said cylinder block;
   (e) a plurality of pistons attached to said cranks, and reciprocably disposed in a said cylinder to form a varying volume chamber therewith; and
   (f) means including a regenerator for connecting each chamber of a first half of said varying volume chambers, respectively, with a different chamber of a second half of said varying volume chambers, said chambers being selectively connected so that upon rotation of said cylinder block and crankshaft in a predetermined direction, the reciprocation of the piston in each chamber of said first half of said varying volume chambers is out of phase with the reciprocation of the piston in each connected chamber of the second half of said varying volume chambers thereby forming a plurality of cooperative regenerative thermal units.

4. A regenerative thermal device according to claim 3, wherein said device includes
   (a) means for heating said first half of said varying volume chambers, and
   (b) means for cooling said second half of said varying volume chambers
whereby the difference between the heat supplied and the heat rejected results in mechanical work output rotating said cylinder block and said crankshaft in said predetermined direction.

5. A regenerative thermal device according to claim 3, wherein said device includes
   (a) means for circulating a first body of air around said first half of said varying volume chambers,
   (b) means for circulating a second body of air at environmental temperature around said second half of said varying sized chambers, and
   (c) means for rotating said cylinder block and crankshaft in said predetermined direction
whereby said first half of said varying volume chambers absorb heat and cool said first body of air below environmental temperature.

6. A regenerative thermal device according to claim 3, wherein said device includes
   (a) means for circulating a first quantity of air around said first half of said varying sized chambers,
   (b) means for circulating a second quantity of air at environmental temperature around said second half of said varying sized chambers, and
   (c) means for rotating said cylinder block and crankshaft in a direction opposite to said predetermined direction
whereby said first half of said varying volume chambers emit heat and heat said first quantity of air above environmental temperature.

7. A regenerative thermal device according to claim 3, wherein said device includes
   (a) means for cooling said first half of said varying volume chambers below environmental temperature and
   (b) means for circulating air at environmental temperature around said second half of said varying volume chamber
whereby the difference between the heat supplied and the heat rejected results in a mechanical work output rotating said cylinder block and said crankshaft in a direction opposite to said predetermined direction.

8. A regenerative thermal device comprising:
   (a) a cylinder block free to rotate about a first axis;
   (b) a crankshaft supported free to rotate about a second axis parallel to and spaced a predetermined distance from said first axis;
   (c) at least two cranks on said crankshaft, each said crank having its center on substantially opposite sides of, and spaced said predetermined distance from, said second axis;
   (d) at least four cylinders supported by said cylinder block;
   (e) at least four pistons each attached to said crank and reciprocably disposed in a said cylinder dividing said cylinder into a first varying volume chamber and a second varying volume chamber;
   (f) an outer annular passage in said cylinder block constructed to allow fluid to be circulated around the first varying volume chambers;
   (g) an inner annular passage in said cylinder block constructed to allow fluid to be circulated around the second varying volume chambers;
   (h) a passage connecting each first varying volume chamber to a second varying volume chamber so that the pistons in the connected chambers are ninety degrees out of phase with each other, said passage including a heat exchanger disposed in said outer annular passage, a regenerator disposed between said outer annular passage and said inner annular passage, and a heat exchanger disposed in said inner annular passage; and
   (i) means for heating the fluid in said outer annular passage while maintaining the fluid in said inner annular passage at a lower temperature thereby inducing rotation of said cylinder block and crankshaft as a result of the mechanical energy produced.

9. A regenerative thermal device comprising:
   (a) a cylinder block free to rotate about a first axis;
   (b) a crankshaft supported free to rotate about a second axis parallel to and spaced a predetermined distance from said first axis;
   (c) a first crank on said crankshaft having its center spaced from said second axis at said predetermined distance;

(d) a second crank on said crankshaft having its center spaced from said second axis at said predetermined distance and 180° around said second axis away from the center of said first crank;

(e) a plurality of cylinders supported by said cylinder block, said plurality of cylinders including a first pair of cylinders closed at both ends and a second pair of cylinders closed at one end;

(f) a pair of displacers each attached to said first crank and each reciprocably disposed in one of said first pair of cylinders dividing each of said first pair of cylinders into a hot space and a cool space;

(g) a regenerator centrally disposed in each of said displacers providing communication through said regenerator material between said hot space and said cool space;

(h) a pair of pistons each attached to said second crank and each repciprocably disposed in one of said second pair of cylinders forming a varying volume cold chamber;

(i) a pair of heat exchangers each connected between a cool space and a varying volume cold chamber;

(j) means for supplying heat to the hot spaces; and (k) means for maintaining said cool spaces, heat exchangers and varying volume cold spaces at a temperature lower than said hot spaces whereby the difference between the heat supplied and heat rejected results in a mechanical work output rotating said cylinder block and crankshaft.

10. A component for a regenerative thermal device comprising:

(a) a cylinder block rotatably mounted to rotate about a first axis;

(b) a plurality of cylinders supported by said cylinder block;

(c) a crankshaft rotatably mounted to rotate about a second axis;

(d) a plurality of pistons reciprocably disposed in said cylinders and rotatably mounted on cranks on said crankshaft;

(e) passages including regenerator means connecting said cylinders in pairs, said cylinder block and crankshaft being arranged to impart reciprocation to said pistons upon rotation about their respective axes, with the pistons in said cylinder pairs being out of phase with each other;

(f) a passage in said cylinder block for allowing fluid to circulate around each said varying volume chamber; and (g) a passage passing from each said varying volume chamber to an opening in the end of said cylinder block, said passage including a regenerator and a heat exchanger.

11. A regenerative thermal device comprising:

(a) a first, second, third, and fourth component, each component including:

(b) a cylinder block free to rotate about a first axis, (c) a crankshaft free to rotate about a second axis parallel to and spaced a predetermined distance from said first axis, (d) a first crank on said crankshaft having its center spaced from said second axis at said predetermined distance, (e) a second crank on said crankshaft having its center spaced from said second axis at said predetermined distance and 180° around said second axis away from the center of said first crank, (f) a passage in said cylinder block for allowing fluid to circulate around each said varying volume chamber;

(g) a passage passing from each said varying volume chamber to an opening in the end of said cylinder block, said passage including a regenerator and a heat exchanger;

(h) each said varying sized chamber of said first component communicating with a varying sized chamber of said second component through said openings in the ends of said cylinder blocks selected so that the pistons in said comunicating varying sized chambers are ninety degrees out of phase with each other;

(i) each said varying sized chambers of said third component communicating with a varying sized chamber of said fourth component through said openings in the ends of said cylinder blocks selected so that the pistons in said communicating varying sized chambers are ninety degrees out of phase with each other;

(j) said crankshafts of all said components being connected;

(k) means for heating the fluid in the passage of said first component; and (l) means for circulating fluid through the passage of said second component at a temperature lower than the fluid in said first component whereby the difference between the heat supplied to the varying volume chambers of said first unit and the heat rejected by the varying chambers of said second unit results in mechanical work output rotating the cylinder blocks and crankshafts of all said components further resulting in temperature below atmospheric in the varying volume chambers of said fourth component.

12. A regenerative thermal device comprising:

(a) a first and second component, each component including:

(b) a cylinder block free to rotate about a first axis, (c) a crankshaft supported free to rotate about a second axis parallel to and spaced a predetermined distance from said first axis, (d) a first crank on said crankshaft having its center spaced from said second axis at said predetermined distance, (e) a second crank on said crankshaft having its center spaced from said second axis at said predetermined distance and 180° around said second axis away from the center of said first crank, (f) a passage in said cylinder block for allowing fluid to circulate around each said varying volume chamber;

(g) a passage passing from each said varying volume chamber to an opening in the end of said cylinder block, said passage including a regenerator and a heat exchanger;

(h) each said varying sized chamber of said first component communicating with a varying sized chamber of said second component through said openings in the ends of said cylinder blocks selected so that the pistons in said communicating varying sized chambers are ninety degrees out of phase with each other;

(i) means for heating the fluid in the passage of said first component;

(j) means for circulating fluid through the passage of said second component at a temperature lower than the fluid in said first component (k) said openings in said cylinder blocks of said first and second components being enlarged so that communication between said varying volume chambers of said components will be maintained during partial rotation of one component relative to the other; and (l) means for partially rotating one component relative to the other to disturb the ninety degree phase relationship of the pistons in the connected varying volume chambers thereby modulating the rotational speed of the device.

13. A component for a regenerative thermal device according to claim 10 having a common cylinder head for said plurality of cylinders that remains stationary as said cylinder rotates.

14. An open cycle regenerative thermal device comprising:
   (a) a cylinder block rotatably mounted to rotate about a first axis;
   (b) a plurality of cylinders supported by said cylinder block;
   (c) a crankshaft rotatably mounted to rotate about a second axis;
   (d) a plurality of pistons reciprocably disposed in said cylinders and rotatably mounted on cranks on said crankshaft;
   (e) an annular ring surrounding and contiguous to said cylinder block;
   (f) a first port in said annular ring communicating with a first pair of said cylinders during that portion of the piston stroke from about the last quarter of the compression stroke to top dead center position;
   (g) at least one heat exchanger communicating with said first port;
   (h) a second port communicating from said at least one heat exchanger to a second pair of said cylinders during that portion of the piston stroke from top dead center position to about the first quarter of the expansion stroke of said pistons within said second cylinders;
   (i) a third port providing communication from a cooled enclosure to said first pair of cylinders during that portion of the piston stroke from top dead center position to bottom dead center position of said pistons;
   (j) a fourth port providing communication from a cooled enclosure to said second pair of cylinders during that portion of the piston stroke from about bottom dead center position to top dead center position.

15. An open cycle regenerative thermal device according to claim 14 wherein said annular ring (e) includes a plurality of sets of ports (f), (h), (i), and (j), with at least one heat exchanger (g) communicating between the ports (f) and (h) in each said set, and said annular ring (e) rotates to allow said ports (f), (h), (i), and (j) to communicate with said cylinders.

References Cited in the file of this patent

UNITED STATES PATENTS

| | | |
|---|---|---|
| 1,275,507 | Vuilleumier | Aug. 13, 1918 |

FOREIGN PATENTS

| | | |
|---|---|---|
| 962,996 | France | Dec. 19, 1949 |